United States Patent
Kobayashi et al.

[11] Patent Number: 5,853,328
[45] Date of Patent: Dec. 29, 1998

[54] POWER TRANSMISSION DEVICE AND CONSTANT VELOCITY UNIVERSAL JOINT THEREFOR

[75] Inventors: Masazumi Kobayashi; Takeshi Kohara; Haruo Nagatani; Yoshikazu Fukumura, all of Iwata, Japan

[73] Assignee: NTN Corporation, Osaka, Japan

[21] Appl. No.: 799,193

[22] Filed: Feb. 13, 1997

[30] Foreign Application Priority Data

Feb. 14, 1996 [JP] Japan .................................. 8-026471
Mar. 26, 1996 [JP] Japan .................................. 8-070535

[51] Int. Cl.[6] .................................................. F16D 3/226
[52] U.S. Cl. .......................... 464/145; 464/146; 464/906
[58] Field of Search .................................. 464/141, 145, 464/146, 906

[56] References Cited

U.S. PATENT DOCUMENTS

| | | | |
|---|---|---|---|
| 4,385,899 | 5/1983 | Franklin, Jr. ............................ | 464/146 |
| 4,573,947 | 3/1986 | Hazebrook et al. ..................... | 464/146 |
| 4,589,857 | 5/1986 | Okoshi .................................... | 464/906 |
| 4,861,316 | 8/1989 | Welschof ................................. | 464/145 |
| 5,106,343 | 4/1992 | Sakaguchi et al. ..................... | 464/146 |
| 5,122,096 | 6/1992 | Aucktor et al. ......................... | 464/145 |
| 5,647,801 | 7/1997 | Jacob ...................................... | 464/145 |

FOREIGN PATENT DOCUMENTS 63-2665  1/1988  Japan .

OTHER PUBLICATIONS

NTN Technical Review, No. 66, Aug. 1997.

*Primary Examiner*—Eileen Dunn Lillis
*Attorney, Agent, or Firm*—Nikaido, Mamelstein, Murray & Oram LLP

[57] ABSTRACT

A double offset type constant velocity universal joint for use in a power transmission system of an automobile comprises an inner member, an outer member, and a plurality of balls for transmitting torque between the Inner and outer members, the balls being retained by means of a cage also interposed between the inner and outer members, the cage being so designed as to allow the inner and outer members to move axially relatively to each other by an effective amount to absorb not only slight vibrations of an engine but also a greater movement of the engine caused by starting acceleration of the automobile.

31 Claims, 8 Drawing Sheets

POWER TRANSMISSION DEVICE AND CONSTANT VELOCITY UNIVERSAL JOINT THEREFOR

BACKGROUND OF THE INVENTION

1. Field of the Invention

The present invention relates to a power transmission device and a constant velocity universal joint therefor having the role of transmitting the power from the engine of an automobile to the wheels.

2. Prior Art

Figure 8:
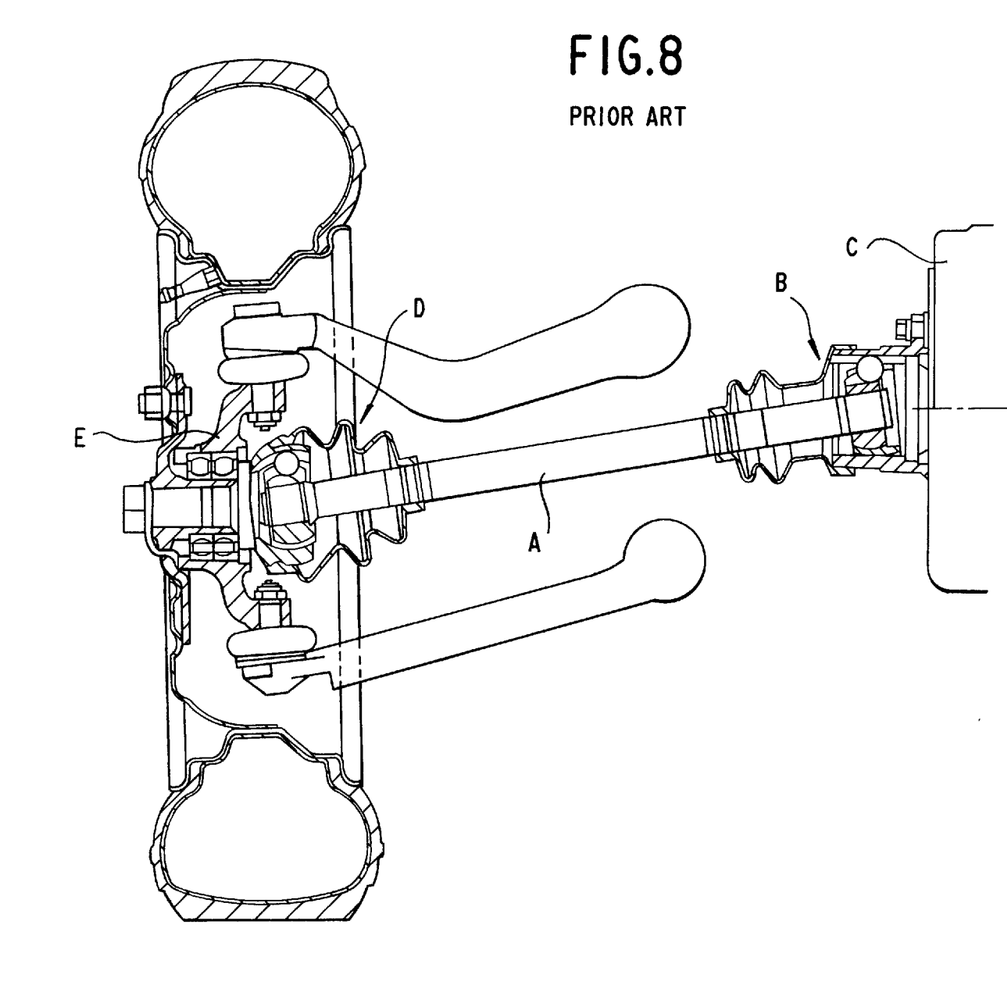
FIG. 8 is a view showing an example of a power transmission device for automobiles.

A power transmission device for transmitting the power from the engine of an automobile to the wheels is required to be able to respond to the angle and axial displacement due to a change in the relative positional relation between the engine and the wheel. For this reason, as shown in FIG. 8, the drive shaft A interposed between the engine and the wheel is connected at one end thereof to a differential C through a plunging or slide type constant velocity universal joint B and at the other end to the wheel E through a fixed type constant velocity universal joint D.

In general, the plunging or slide type constant velocity universal joint B used in a power transmission device for automobiles is available in two types; the double offset type constant velocity universal joint and the tripod type constant velocity universal joint.

Figure 9:
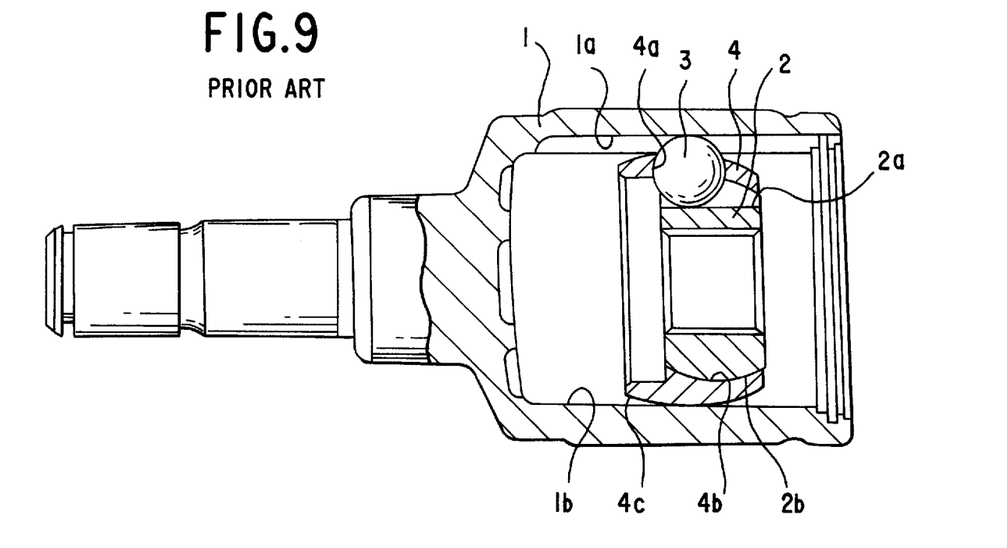
FIG. 9 is a sectional view showing the construction of a common double offset type constant velocity universal joint used in a power transmission device for automobiles.

The double offset type constant velocity universal joint, as shown in FIG. 9, comprises an outer member 1 formed with a cylindrical hole 1b having a plurality of straight guide grooves 1a extending parallel with the axis, an inner member 2 having the same number of straight guide grooves 2a extending parallel with the axis as the guide grooves 1a of the outer member 1 and having an outer surface 2b which is at least partly spherical, a plurality of balls 3 for transmission of torque received in ball tracks defined by cooperation between the guide grooves 1a of the outer member 1 and the guide grooves 2a of the inner member 2, and a cage 4 having ball pockets 4a for receiving the respective balls 3, guided by contact with both the partial spherical outer surface 2b of the inner member 2 and the cylindrical hole 1b of the outer member 17 and having partial spherical inner and outer surfaces 4b and 4c having centers of curvature offset axially of the joint by the same distance on the opposite sides of the ball center line, the arrangement being such that when an operating angle is imparted between the outer and inner members 1 and 2, the balls 3 are controlled to be positioned on the bisecting plane of the operating angle so as to maintain the nature of being constant in velocity.

Figure 10:
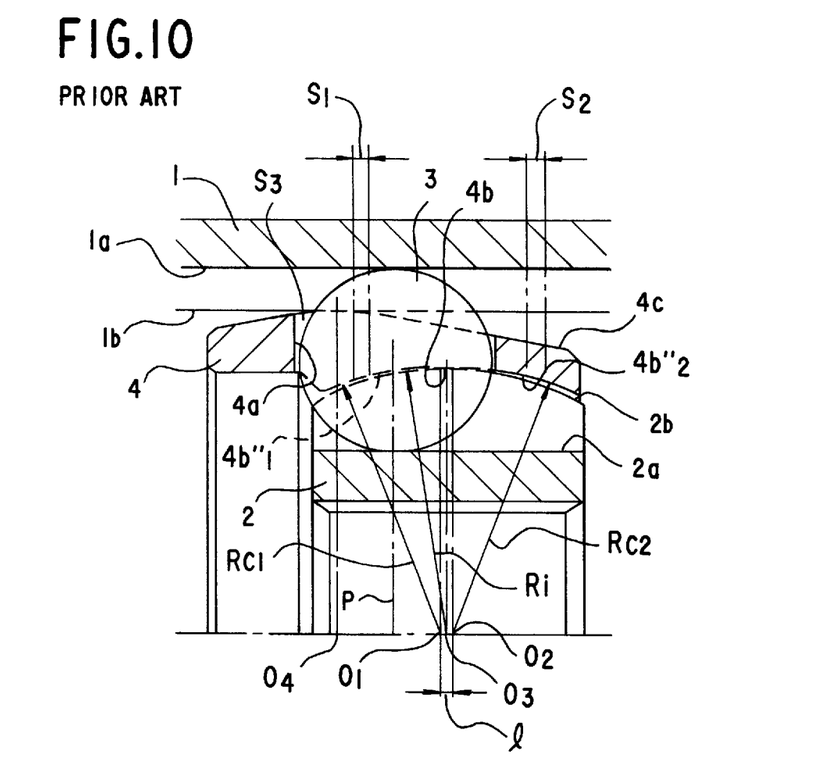
FIG. 10 is a principal enlarged sectional view of a conventional constant velocity universal Joint whose slide resistance in the joint interior is reduced.

As for this type of constant velocity universal joint, there is one shown in FIG. 10 which is designed to reduce the slide resistance in the joint interior to ensure smooth axial displacement while allowing axial displacement between the outer and inner members 1 and 2 (see Japanese Utility Model Publication No. Sho 63-2665).

In this constant velocity universal joint, the inner surface 4b of the cage 4 comprises an axially centrally disposed cylindrical surface 4b and partial spherical surfaces $4b''_1$ and $4b''_2$ continuously formed on the opposite sides thereof, the radii of curvature $Rc_1$ and $Rc_2$ of the partial spherical surfaces $4b''_1$ and $4b''_2$ being seemingly equal to the radius of curvature $Ri$ of the outer surface 2b of the inner member 2. The center of curvature $O_4$ of the outer surface 4c of the cage 4 is axially offset with respect to the ball center line P and the axial center $O_3$ of the inner surface 4b (which coincides with the center of curvature of the outer surface 2b of the inner member 2) is offset by the same distance to the side opposite to the center of curvature $O_4$ of the outer surface 4c with respect to the ball center line P. And the centers of curvature $O_1$ and $O_2$ of the partial spherical surfaces $4b''_1$ and $4b''_2$ are offset by the same distance to the opposite sides from the axial center $O_2$ of the inner surface 4b, whereby axial clearances $S_1$ and $S_2$ are defined between the inner surface 4b of the cage 4 and the outer surface 2b of the inner member 2. Further, a slight clearance $S_3$ (5–50 μm) is defined between the ball 3 and the ball pocket 4a of the cage 4 to ensure smooth rolling of the ball 3.

In this constant velocity universal joint, the presence of the axial clearances $S_1$ and $S_2$ allows a relative axial small movement between the inner member 2 and the cage 4, while the presence of the pocket clearance $S_3$ ensures smooth rolling of the ball 3, attaining the reduction of the axial slide resistance of the joint.

Thus, the conventional automobile power transmission device uses the constant velocity universal joint shown in FIG. 10 as a constant velocity universal joint for connecting the drive shaft to the differential and utilizes the axial clearances $S_1$ and $S_2$ between the cage 4 and the outer surface 2b of the inner member 2 and the slight clearance $S_3$ between the ball 3 and the ball pocket 4a of the case 4, so as to absorb vibrations from the engine, thereby preventing them from being transmitted to the various parts of the car body.

However, the constant velocity universal joint shown in the conventional automobile power transmission device is capable of absorbing vibrations from the engine only when the vibrations are small, but when the engine and differential are moved to a greater extent under the action of inertial force as during starting accelerations it cannot absorb the vibrations. This is proved by FIG. 11.

Figure 11:
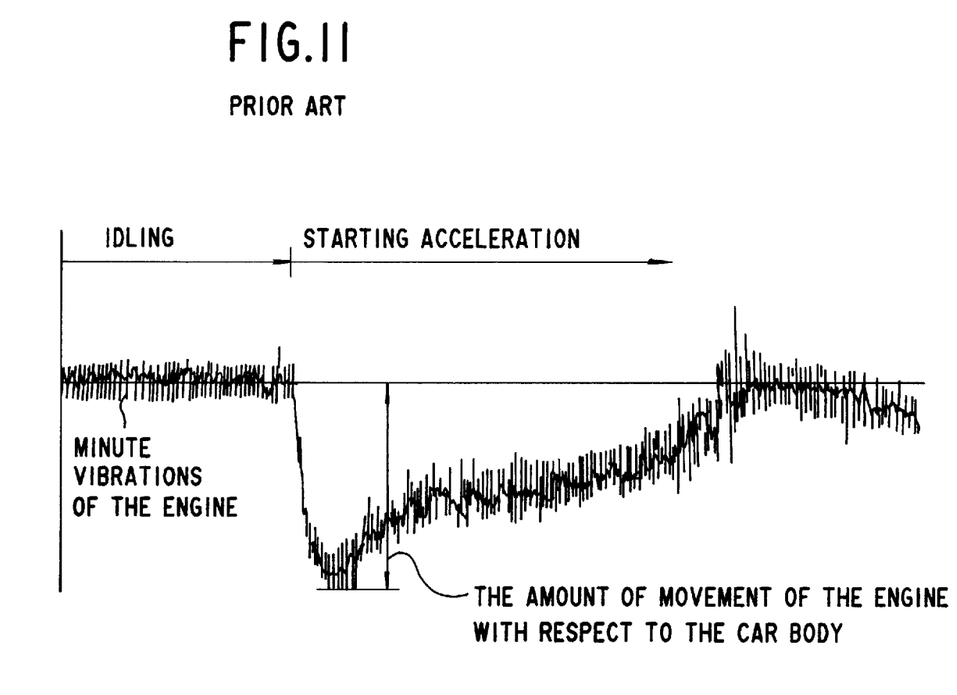
FIG. 11 is a graph showing the amount of movement of the engine during starting acceleration of the automobile.

FIG. 11 shows the results of measurement of the amount of movement of the engine during starting acceleration of an automobile. The measurement of the amount of movement of the engine was achieved by attaching a sensor for measuring the horizontal distance between the car body and the engine, starting the automobile from the stopped state (during idling), then accelerating to a given velocity, and continuously reading or recording the measured values from the sensor. As a result, It has been found that, the engine is vibrating with slight movement in the stopped state (during idling) of the automobile and that the amount of movement of the engine increases during starting acceleration. This is due to the fact that during starting acceleration, the inertial force comes to act on the vehicle to cause the engine to be moved to a great extent with respect to the car body. Therefore, during Idling when the automobile is stopped, since the vibrations of the engine itself are small even the constant velocity universal joint shown in FIG. 10 can absorb them; however, during starting acceleration of the automobile, the constant velocity universal joint shown in FIG. 10 cannot absorb the amount of movement of the engine since the axial clearance $S_1$ and $S_2$ between the cage 4 and the inner member 2 are small.

Thus, if the constant velocity universal joint fails to absorb the amount of movement of the engine produced during starting acceleration of the automobile, the movement of the engine is transmitted to the car body to degrade the ride quality of the automobile.

SUMMARY OF THE INVENTION

A main object of the invention is to absorb the amount of movement of the engine even when the engine is moved to a great extent with respect to the car body by the inertial force during starting acceleration of the automobile.

In one aspect of the invention, a constant velocity universal joint comprises an outer member formed with a cylindrical hole having a plurality of straight guide grooves extending parallel with the axis, an inner member having the same number of straight guide grooves extending parallel with the axis as said guide grooves of the outer member and having an outer surface which is at least partly spherical, a plurality of balls for transmission of torque received in ball tracks defined by cooperation between the guide grooves of said outer and inner members, and a cage having ball pockets for receiving the respective balls, guided by contact with both the partial spherical outer surface of the inner member and the cylindrical hole of the outer member, and having partial spherical inner and outer surfaces having centers of curvature offset axially of the joint by the same distance on the opposite sides of the ball center line, wherein a pocket clearance is axially defined between the ball and the ball pocket of the cage, and the inner surface of the cage is comprised of a cylindrical surface axially of the central portions thereof having a sufficient length to absorb the amount of movement of the engine produced during starting acceleration of the automobile, and partial spherical surfaces connected to opposite sides of the cylindrical surface.

In another aspect of the invention, a power transmission device for automobiles comprises a slide type constant velocity universal joint connected to one end of the drive shaft and a fixed type constant velocity universal joint connected to the other end of the drive shaft, the plunging or type constant velocity universal joint having the arrangement described above.

According to the present invention, since the length of the cylindrical surface of the inner surface of the cage is such that it is capable of absorbing the amount of movement of the engine produced during starting acceleration of the automobile, there is defined a large axial clearance between the cage and the inner member, the axial clearance being effective to absorb not only slight vibrations of the engine itself during running or during idling when the automobile is stopped, but also the amount of movement of the engine with respect to the car body produced during starting acceleration of the automobile, whereby transmission of vibrations to the car body is prevented.

These and other objects, advantages, features, and uses will become more apparent as the description proceeds, when considered with the accompanying drawings.

DESCRIPTION OF THE PREFERRED EMBODIMENTS

Embodiments of the invention will now be described.

Figure 1A:
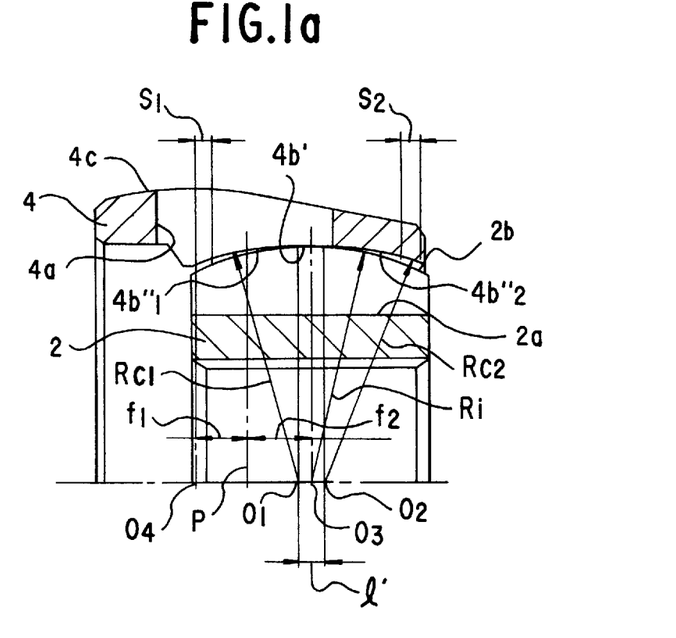
FIGS. 1a and 1b are principal enlarged sectional views showing the static state of a constant velocity universal joint used in a power transmission device for automobiles according to the present invention.
Figure 1B:
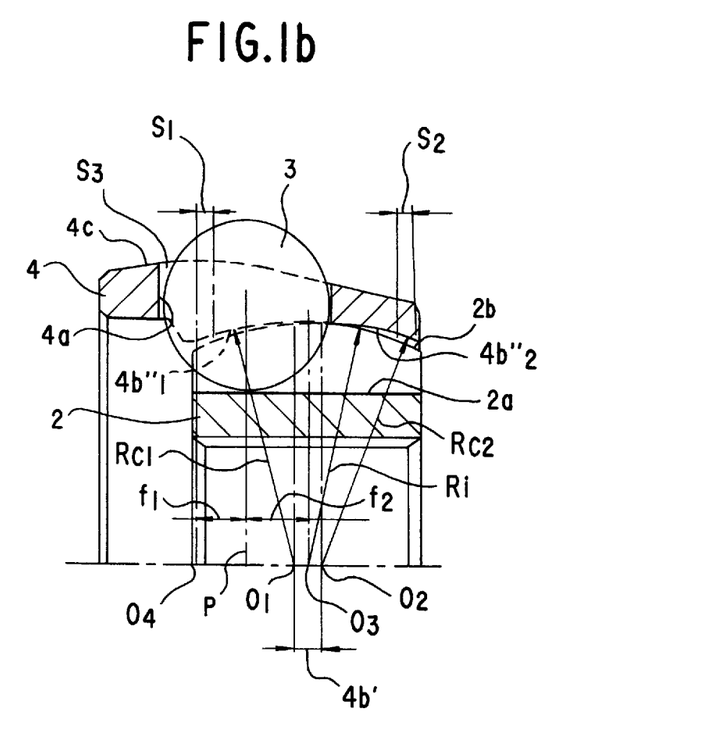
Figure 2:
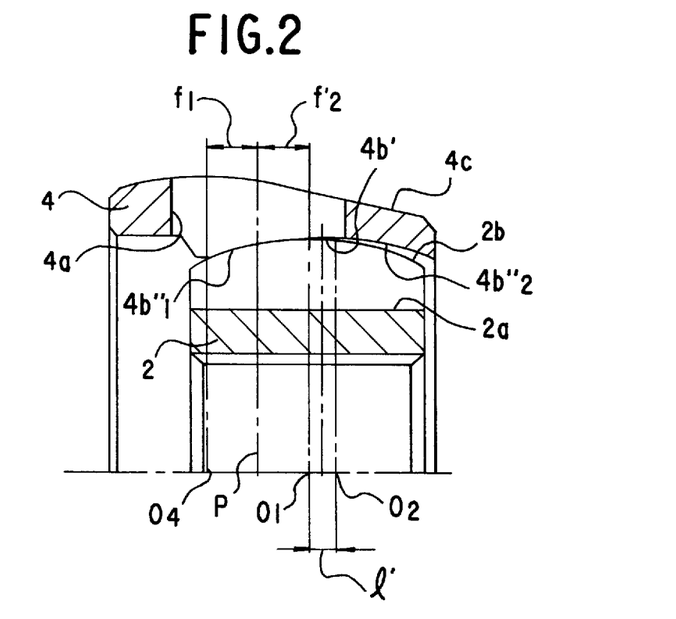
FIG. 2 is a principal enlarged sectional view showing the static state of a constant velocity universal joint used in a power transmission device for automobiles according to the present invention.

FIGS. 1a, 1b, and 2 each are a principal enlarged sectional view of the interior of a constant velocity universal joint used in a power transmission device for automobiles according to another embodiment of the present invention, and the names and reference characters of the respective members are the same as in FIGS. 9 and 10 described above, so that the repetitive portion of a description thereof will be omitted.

If it is desired to absorb the amount of movement of the engine with respect to the car body produced during starting acceleration of the automobile, it is necessary to increase the axial clearances $S_1$ and $S_2$ between the cage 4 and the inner member 2 of the constant velocity universal joint.

Thus, the constant velocity universal joint used in a power transmission device for automobiles according to the present invention is designed such that in order to increase the axial clearances $S_1$ and $S_2$ between the cage 4 and the inner member 2, the axial length of the cylindrical surface 4b' of the inner surface 4b of the cage 4 is remarkably increased as compared with the length employed at present. Thereby, the axial clearances $S_1$ and $S_2$ between the cage 4 and the inner member 2 have been sufficiently increased to absorb the amount of movement of the engine with respect to the car body produced during starting acceleration of the automobile. That is, they are increased from the conventional value of about 1 mm to 2–4 mm. Clearance $S_3$ ca be seen in FIG. 1b, between ball 3 and ball pocket 4a. The axial length of the cylindrical surface is l.

In the power transmission device for automobiles according to the invention, thanks to the arrangement in which the axial clearances $S_1$ and $S_2$ between the cage 4 and the inner member 2 of the constant velocity universal joint are increased, not only slight vibrations of the engine itself produced during running or idling when the automobile is stopped, but also the amount of movement of the engine with respect to the car body produced during starting acceleration of the automobile are absorbed by the axial clearances $S_1$ and $S_2$, whereby transmission of vibrations to the car body is prevented.

Figure 3:
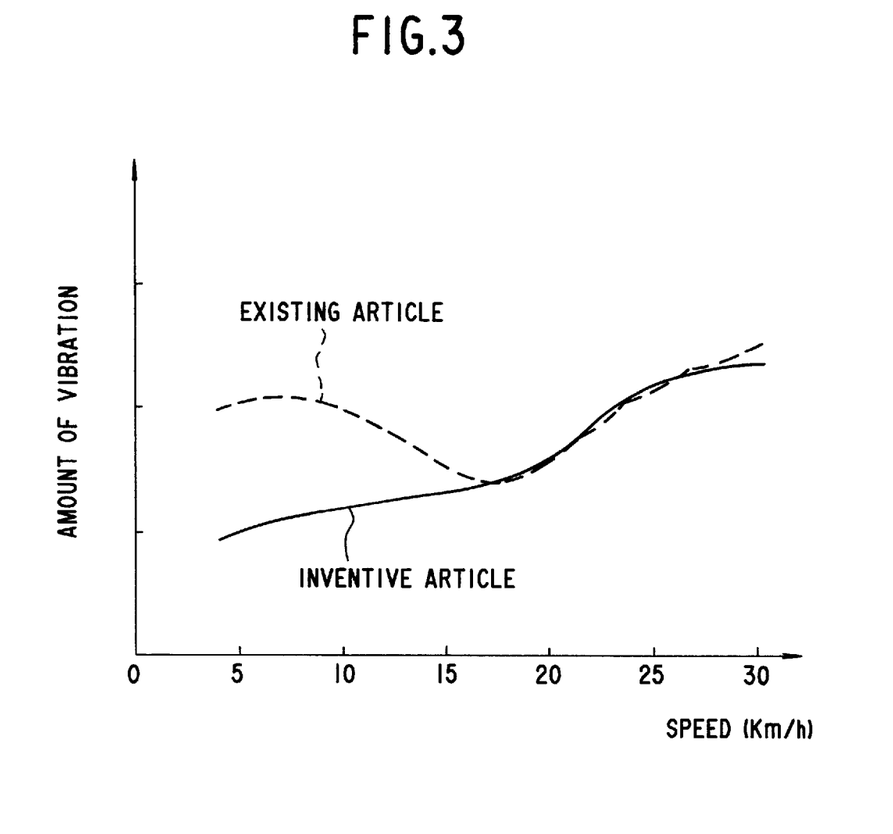
FIG. 3 is a graph showing comparison between the present inventive article and an existing article as to the amount of vibration of the car body during starting acceleration of the automobile.

FIG. 3 shows the results of measurements of the amounts of vibration of the car body (floor) during starting acceleration for automobiles having applied thereto the present inventive power transmission device and an existing power transmission device, respectively in making the measurements, a sensor is attached to the car body (floor) to measure vibrations and the automobile is started from the stopped state (during Idling) and accelerated until it gains a fixed velocity, when the measured value is continuously read and recorded from the sensor. As a result, it has been found that the present inventive article, as compared with the existing article, has a much less amount of vibration of the car body (floor) during starting acceleration, indicating that it is excellent in absorbing the amount of movement of the engine with respect to the car body produced during the starting acceleration of the automobile.

Now, if the axial length of the cylindrical surface 4b' of the inner surface 4b of the cage 4 is increased in order to increase the axial clearances $S_1$ and $S_2$ between the cage 4 and the inner member 2 of the constant velocity universal joint, the amount of movement of the engine with respect to the car body produced during the starting acceleration of the automobile could be absorbed, but there would arise a disadvantage that when the inner member 2 is pushed deep into the outer member 1 with an operating angle imparted between the outer and inner members 1 and 2 during incorporation into the vehicle, the ball 3 is locked by a wedge effect, making the joint inoperative. That is, since the constant velocity universal joint is of the construction in which the ball 3 is controlled to be positioned on the bisecting plane of the operating angle by the cage 4 provided with the partial spherical inner surface 4b and outer surface 4c offset axially by the same distance with respect to the ball center line P, if there is produced much difference in the amount of offset between the inner and outer surfaces 4b and 4c of the cage 4 with respect to the ball center line P as the inner member 2 is pushed deep into the outer member 4c with an operating angle imparted between the outer and inner members 1 and 2, the ball is moved away from the ball center line P to be pushed into a region between the guide grooves 1a and 2a of the outer and inner members 1 and 2, in which region it is impossible for the ball 3 to be present, without interference of guide grooves thus causing a locking phenomenon of the ball. Therefore, there are cases where during incorporation into the vehicle, the constant velocity joint is locked making it hard to effect incorporation. In addition, such locking phenomenon of the ball 3 takes place only during the assembling the constant velocity universal joint into the vehicle. There has been found no locking phenomenon of the ball 3 when the joint is rotating as this was ascertained by testing with actual automobiles.

Further, in the case where the axial clearances $S_1$ and $S_2$ between the cage 4 and the inner member 2 of the constant velocity universal joint are large, the amount of shift of the inner member 2 toward the axial clearance $s_2$ also increases, resulting in the region of contact between the ball 3 and the guide groove 2a of the inner member 2 being shifted toward the innermost end of the inner member 2 by an amount corresponding to the amount of shift of the inner member 2. Therefore, if a large operating angle is imparted between the outer and inner members 1 and 2, the region of contact is shifted from the innermost end surface of the guide groove 2a, sometimes degrading the normal function of the constant velocity universal joint.

Thus, in order to solve the problem of the looking of the ball 3 occurring when the inner member 2 is pushed deep into the outer member 1 with an operating angle imparted between the outer and inner members 1 and 2 during incorporation into the vehicle, the amount of offset $f_2$ of the inner surface 4b of the cage 4 member 2 is made greater than the amount of offset $f_1$ of the outer surface 4c of the cage 4 ($f_1<f_2$) with respect to the ball center line P in the static state in which the center positions of the outer surface 2b of the inner member 2 and the inner surface 4b of the cage 4 coincide with each other, and as shown in FIG. 2, with the inner member 2 pushed into the innermost side of the cylindrical hole 1b of the outer member 1 the amount of offset $f_1$ of the outer surface 4c of the cage 4 is made substantially equal to the amount of offset (the length of contact from the ball center line P between the cage 4 and the inner member 2) $f_2$ of the inner surface 4b. As a result, even if the inner member 2 is pushed into the innermost side of the outer member 1 with an operating angle imparted between the outer and inner members 1 and 2 during incorporation into the vehicle, the ball 3 is positioned on the ball center line P, never being locked.

Thanks to this arrangement in which the amount of offset $f_1$ of the outer surface 4c of the cage and the amount of offset $f_2$ of the outer surface 4b are substantially at the same distance with the inner member 2 of the constant velocity universal joint pushed into the innermost side of the cylindrical hole 1b of the outer member 1, the phenomenon of locking of the ball 3 is eliminated which is occurrable when the inner member 2 is pushed into the innermost side of the outer member 1 during incorporation into the vehicle in the case where the axial clearances $S_1$ and $S_2$ between the cage 4 and the inner member 2 of the constant velocity universal joint are large; thus, the incorporation into the vehicle can be effected very smoothly.

Figure 4:
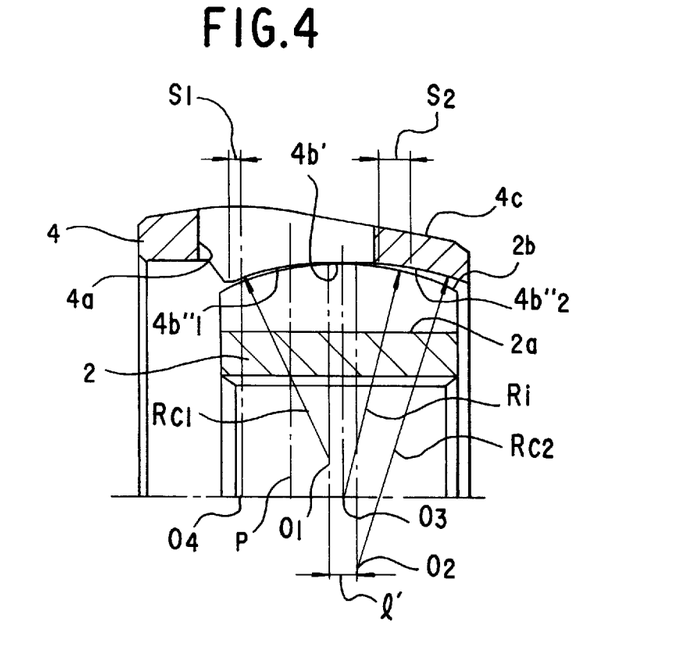
FIG. 4 is a principal enlarged sectional view showing the static state of a constant velocity universal joint used in a power transmission device for automobiles according to another embodiment of the present invention.
Figure 5:
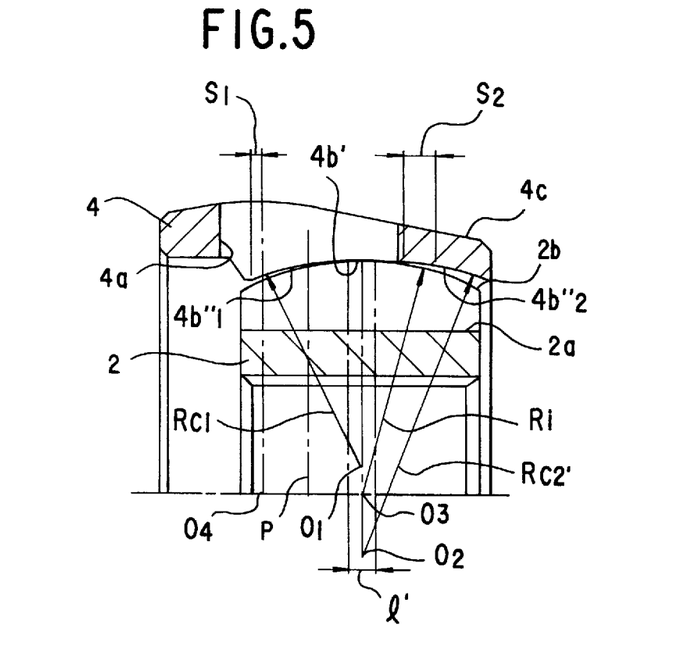
FIG. 5 is a principal enlarged sectional view showing the static state of a constant velocity universal joint used in a power transmission device for automobiles according to another embodiment of the present invention.
Figure 6:
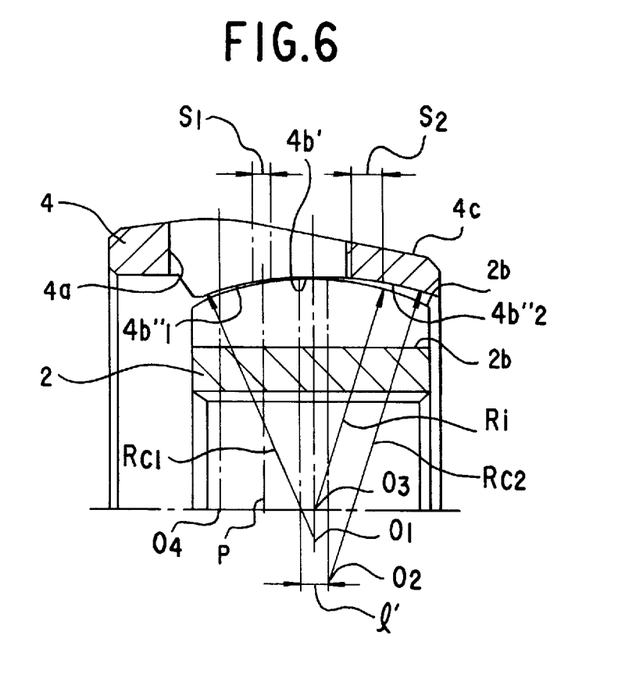
FIG. 6 is a principal enlarged sectional view showing the static state of a constant velocity universal joint used in a power transmission device for automobiles according to another embodiment of the present invention.

FIGS. 4–6 are principal enlarged sectional views of constant velocity universal joints for automobiles according to other embodiments of the invention, and in each case, in order to solve the problem of the locking of the ball 3 occurring when the inner member 2 is pushed into the innermost side of the outer member 1 during incorporation into the vehicle in the case where the axial clearances $S_1$ and $S_2$ between the cage 4 and the inner member 2 of the constant velocity universal joint are large, the radius of curvature $Rc_2$ of a partial spherical surface $4b''_2$ positioned at the inlet side of the outer member 1 is made greater than the radius of curvature $Rc_1$ of a partial spherical surface $4b''_1$ of the inner surface 4b of the cage 4 positioned in the innermost side of the outer member 1 ($Rc_1<Rc_2$), thereby making the inner surface 4b of the cage 4 asymmetrical between the innermost side and inlet side of the outer member 1.

That is, in the arrangement shown in FIG. 4, the centers of curvature $O_1$ and $O_2$ of the partial spherical surfaces $4b''_1$ and $4b''_2$ of the inner surface 4b of the cage 4 are offset from the center of curvature $O_3$ of the outer surface 2b of the inner member 2 axially and radially to opposite sides, whereby the radius of curvature $Rc_2$ of the partial spherical surface $4b''_2$ is set greater than the radius of curvature $Rc_1$ of the partial spherical surface $4b''_1$ of the inner surface 4b of the cage 4.

In the arrangement shown in FIG. 5, the centers of curvature $O_1$ and $O_2$ of the partial spherical surfaces $4b''_1$ and $4b''_2$ of the inner surface 4b of the cage 4 are offset from the center of curvature $O_3$ of the outer surface 2b of the inner member 2 to diametrically opposite sides, whereby the radius of curvature $Rc_2$ of the partial spherical surface $4b''_2$ is set greater than the radius of curvature $Rc_1$ of the partial spherical surface $4b''_1$ of the inner surface 4b of the cage 4.

In the arrangement shown in FIG. 6, the center of curvature $O_2$ of the partial spherical surface $4b''_2$ of the inner surface 4b of the cage 4 is radially offset by a greater amount than the center of curvature $O_1$ of the partial spherical surface $4b''_1$ and is also offset axially from the center of curvature $O_3$ of the outer surface 2b of the inner member 2 to the inlet side of the outer member 1, whereby the radius of curvature $Rc_2$ of the partial spherical surface $4b''_2$ is set greater than the radius of curvature $Rc_1$ of the partial spherical surface $4b''_1$ of the inner surface 4b of the cage 4.

Thanks to this arrangement in which the radius of curvature $Rc_2$ of the partial spherical surface $4b''_2$ is set greater than the radius of curvature $Rc_1$ of the partial spherical surface $4b''_1$ of the inner surface 4b of the cage 4 to make the inner surface 4b of the cage 4 asymmetrical between the innermost side and the inlet side of the outer member, the axial clearances $S_1$ and $S_2$ between the cage 4 and the inner member 2 are dimensioned such that they cooperate with each other to absorb the amount of movement of the engine produced at the start of the automobile while the axial clearance $S_1$ in the innermost side of the outer member 1 is substantially as large as the corresponding one in the prior art. Thus, even if the inner member 2 is pushed into the innermost side of the outer member 1, the ball 3 is positioned on the ball center line, never being locked since the axial clearance $S_1$ is substantially as large as the corresponding one in the prior art and hence the amounts of offset in the outer and inner surfaces 4c and 4b of the cage 4 are substantially equal.

Figure 7:
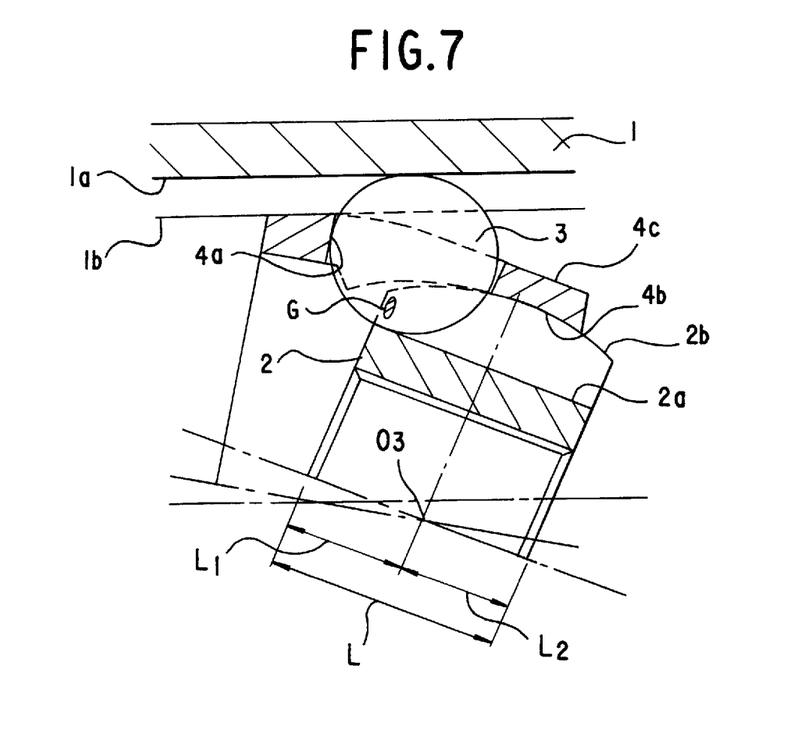
FIG. 7 is a principal enlarged sectional view showing the static state of a constant velocity universal joint used in a power transmission device for automobiles according to another embodiment of the present invention, illustrating a large operating angle provided between the outer and inner members.

FIG. 7 shows a means which, in the case where the axial clearances $S_1$ and $S_2$ between the cage 4 and the inner member 2 are large, solves the problem of the region of contact G between the ball 3 and the guide groove 2a of the inner member 2 from running off the innermost end surface of the guide groove 2a of the inner member 2, the figure showing a state in which a large operating angle is Imparted between the outer and inner members 1 and 2, the length L of the guide groove 2a of the inner member 2 being such that with respect to the center of curvature $O_3$ of the inner member 2, the innermost side of the inner member 2 is greater than the inlet side thereof substantially correspondingly to the axial clearance $S_2$ (innermost side length $L_1$>inlet side length $L_2$), whereby, even if a large operating angle is imparted between the outer and inner members 1 and 2 to deviate the inner member 2 toward the inlet side of the outer member 1 by an amount corresponding to the axial clearance $S_2$, there is no possibility of the contact region G between the ball 3 and the guide groove 2a of the inner member 2 running off the innermost end surface of the guide groove 2a of the inner member 2, so that the torque transmitting function can be secured as in the prior art.

As has been described so far, since the cylindrical surface of the inner surface of the cage of a constant velocity universal joint is increased in length to increase the axial clearance between the cage and the inner member, it is possible to absorb the amount of movement of the engine with respect to the car body, as well as slight vibrations of the engine itself produced during running of the automobile and during Idling when it is stopped, thus providing an automobile in which transmission of vibrations to the car body is prevented and which rides quiet and comfortable. Further, since it is only necessary to change part of the constant velocity universal joint, the invention does not incur cost increase as compared with one in the prior art and is highly practical.

Further, the locking phenomenon of the ball is eliminated which is occurrable when the inner member is pushed into the innermost side of the cylindrical hole of the outer member in the case where the Axial clearance between the cage and the inner member of a constant velocity universal joint, is large incorporation into the car body can be effected very smoothly Further, since the length of the groove of the inner member is increased toward the innermost side of the outer member by an amount substantially corresponding to an increase in the axial clearance, the torque transmitting function when an operating angle is imparted can be secured as in the prior art, and since the length of the guide groove of the inner member at the inlet side of the outer member is decreased by an amount corresponding to an increase in the axial clearance, the overall length of the inner member can be set at the same value as in the conventional article, thereby checking an increase in cost.

As many apparently widely different embodiments of this invention may be made without departing from the spirit and scope thereof, it is to be understood that the invention is not limited to the specific embodiments thereof except as defined in the appended claims.

What is claimed is:

1. A constant velocity universal joint for coupling together two rotary axes in a drive system for an automobile, comprising:

an outer member adapted to connect with one of the rotary axes, said outer member having a cylindrical hole with a plurality of axially extending guide grooves formed in a cylindrical inner surface thereof, an inner member adapted to connect with the other of the rotary axes, said inner member having an outer surface which is at least partly spherical, with the same number of axially extending guide grooves as the guide grooves of said outer member formed in the outer surface, a plurality of balls for transmission of torque, each of said balls being received in a ball track defined by a pair of opposing guide grooves of said outer and inner members, and a cage having ball pockets for receiving the respective balls, said cage having partial spherical inner and outer surfaces of which centers of curvature are offset axially of the joint by the same distance on the opposite sides of the ball center line and the partial spherical surfaces of the cage are respectively guided by contact with the partial spherical outer surface of said inner member and the cylindrical hole of said outer member, a pocket clearance is axially defined between said ball and the ball pocket of said cage allowing for smooth rolling of said ball, and the inner surface of said cage is comprised of a cylindrical surface portion, the inner partial spherical surfaces being connected to opposite sides of said cylindrical surface portion, said cylindrical surface portion has a sufficient length measured axially of a central portion of the cage to allow for relative movement of the inner member with respect to the cage thereby bringing a portion of the outer surface of the inner member into engagement with one of the partial spherical surfaces of the cage, to absorb an amount of movement of an engine produced during starting acceleration of the automobile.

2. A constant velocity universal joint as set forth in claim 1, wherein the pocket clearance between the ball and the ball pocket of the cage is 5–50 $\mu$m, and the length of the cylindrical surface of the inner surface of the cage is 2–4 mm.

3. A constant velocity universal joint as set forth in claim 2, wherein when the inner member is pushed into the innermost side of the outer member, the amounts of offset of the inner and outer surfaces of the cage with respect to the ball center line are substantially equal.

4. A constant velocity universal joint as set forth in claim 2, wherein in a state in which the center positions of the outer surface of the inner member and the inner surface of the cage coincide with each other, the amount of offset from the ball center line is greater for the inner surface of the cage than for the outer surface of the cage.

5. A constant velocity universal joint as set forth in claim 2, wherein the inner surface of the cage is asymmetrical when seen in an axial cross-section, and a radius of curvature of a portion of the inner surface of the cage positioned at the inlet side of the cylindrical hole of the outer member is larger than the radius of curvature of the portion positioned at the innermost side of the cylindrical hole of the outer member.

6. A constant velocity universal joint as set forth in claim 2, wherein of the guide groove of the inner member, the portion extending from the center of curvature of the outer surface of the inner member to the end positioned at the innermost side of the cylindrical hole of the outer member is longer than the portion extending from the center of curvature of the outer surface of the inner member to the end positioned at the inlet side of the cylindrical hole of the outer member.

7. A constant velocity universal joint as set forth in claim 2, wherein of the inner surface of the cage, the partial spherical surfaces positioned on opposite sides of the cylindrical surface are asymmetrical.

8. A constant velocity universal joint as set forth in claim 7, wherein of the guide groove of the inner member, the portion extending from the center of curvature of the outer surface of the inner member to the end positioned at the innermost side of the cylindrical hole of the outer member is longer than the portion extending from the center of curvature of the outer surface of the inner member to the end positioned at the inlet side of the cylindrical hole of the outer member.

9. A constant velocity universal joint as set forth in claim 2, wherein of the inner surface of the cage, the partial spherical surfaces positioned on opposite sides of the cylindrical surface are symmetrical.

10. A constant velocity universal joint as set forth in claim 9, wherein when the inner member is pushed into the innermost side of the outer member, the amounts of offset of the inner and outer surfaces of the cage with respect to the ball center line are substantially equal.

11. A constant velocity universal joint as set froth in claim 9, wherein the inner surface of the cage is asymmetrical when seen in an axial cross-section, and a radius of curvature of a portion of the inner surface of the cage positioned at the inlet side of the cylindrical hole of the outer member is larger than the radius of curvature of the portion positioned at the innermost side of the cylindrical hole of the outer member.

12. A constant velocity universal joint as set forth in claim 9, wherein of the guide groove of the inner member, the portion extending from the center of curvature of the outer surface of the inner member to the end positioned at the innermost side of the cylindrical hole of the outer member is longer than the portion extending from the center of curvature of the outer surface of the inner member to the end positioned at the inlet side of the cylindrical hole of the outer member.

13. A constant velocity universal joint as set forth in claim 9, wherein in a state in which the center positions of the outer surface of the inner member and the inner surface of the cage coincide with each other, the amount of offset from the ball center line is greater for the inner surface of the cage than for the outer surface of the cage.

14. A constant velocity universal joint as set forth in claim 1, wherein of the inner surface of the cage, the partial spherical surfaces positioned on opposite sides of the cylindrical surface are symmetrical.

15. A constant velocity universal joint as set forth in claim 14, wherein when the inner member is pushed into the innermost side of the outer member, the amounts of offset of the inner and outer surfaces of the cage with respect to the ball center line are substantially equal.

16. A constant velocity universal joint as set forth in claim 14, wherein in a state in which the center positions of the outer surface of the inner member and the inner surface of the cage coincide with each other, the amount of offset from the ball center line is greater for the inner surface of the cage than for the outer surface of the cage.

17. A constant velocity universal joint as set forth in claim 14, wherein of the guide groove of the inner member, the portion extending from the center of curvature of the outer surface of the inner member to the end positioned at the innermost side of the cylindrical hole of the outer member is longer than the portion extending from the center of curvature of the outer surface of the inner member to the end positioned at the inlet side of the cylindrical hole of the outer member.

18. A constant velocity universal joint as set forth in claim 14, wherein the inner surface of the cage is asymmetrical when seen in an axial cross-section, and a radius of curvature of a portion of the inner surface of the cage positioned at the inlet side of the cylindrical hole of the outer member is larger than the radius of curvature of the portion positioned at the innermost side of the cylindrical hole of the outer member.

19. A constant velocity universal joint as set forth in claim 1, wherein of the inner surface of the cage, the partial spherical surfaces positioned on opposite sides of the cylindrical surface are asymmetrical.

20. A constant velocity universal joint as set forth in claim 19, wherein the inner surface of the cage is asymmetrical when seen in an axial cross-section, and a radius of curvature of a portion of the inner surface of the cage positioned at the inlet side of the cylindrical hole of the outer member is larger than the radius of curvature of the portion positioned at the innermost side of the cylindrical hole of the outer member.

21. A constant velocity universal joint as set forth in claim 19, wherein in a state in which the center positions of the outer surface of the inner member and the inner surface of the cage coincide with each other, the amount of offset from the ball center line is greater for the inner surface of the cage than for the outer surface of the cage.

22. A constant velocity universal joint as set forth in claim 19, wherein of the guide groove of the inner member, the portion extending from the center of curvature of the outer surface of the inner member to the end positioned at the innermost side of the cylindrical hole of the outer member is longer than the portion extending from the center of curvature of the outer surface of the inner member to the end positioned at the inlet side of the cylindrical hole of the outer member.

23. A constant velocity universal joint as set forth in claim 1, wherein when the inner member is pushed into the innermost side of the outer member, the amounts of offset of the inner and outer surfaces of the cage with respect to the ball center line are substantially equal.

24. A constant velocity universal joint as set forth in claim 23, wherein of the guide groove of the inner member, the portion extending from the center of curvature of the outer surface of the inner member to the end positioned at the innermost side of the cylindrical hole of the outer member is longer than the portion extending from the center of curvature of the outer surface of the inner member to the end positioned at the inlet side of the cylindrical hole of the outer member.

25. A constant velocity universal joint as set forth in claim 1, wherein in a state in which the center positions of the outer surface of the inner member and the inner surface of the cage coincide with each other, the amount of offset from the ball center line is greater for the inner surface of the cage than for the outer surface of the cage.

26. A constant velocity universal joint as set forth in claim 1, wherein the inner surface of the cage is asymmetrical when seen in an axial cross-section, and a radius of curvature of a portion of the inner surface of the cage positioned at the inlet side of the cylindrical hole of the outer member is larger than the radius of curvature of the portion position at the innermost side of the cylindrical hole of the outer member.

27. A constant velocity universal joint as set forth in claim 1, wherein of the guide groove of the inner member, the portion extending from the center of curvature of the outer surface of the inner member to the end positioned at the innermost side of the cylindrical hole of the outer member is longer than the portion extending from the center of curvature of the outer surface of the inner member to the end positioned at the inlet side of the cylindrical hole of the outer member.

28. A power transmission device for an automobile including a drive shaft connected at one end thereof directly to the engine through a slide type constant velocity universal joint and at the other end thereof to the wheels through a fixed type constant velocity universal joint, said slide type constant velocity universal joint comprising:

outer member adapted to connect with one of the rotary axes, said outer member having a cylindrical hole with a plurality of axially extending guide grooves formed in a cylindrical inner surface thereof, an inner member adapted to connect with the other of the rotary axes, said inner member having an outer surface which is at least partly spherical, with the same number of axially extending guide grooves as the guide grooves of said outer member formed in the outer surface, a plurality of balls for transmission of torque, each of said balls being received in a ball track defined by a pair of opposing guide grooves of said outer and inner members, and a cage having ball pockets for receiving the respective balls, said cage having partial spherical inner and outer surfaces of which centers of curvature are offset axially of the joint by the same distance on the opposite sides of the ball center line and the partial spherical surfaces are respectively guided by contact with the partial spherical outer surface of said inner member and the cylindrical hole of said outer member, a pocket clearance is axially defined between said ball and the ball pocket of said cage allowing for smooth rolling of the ball, and the inner surface of said cage is comprised of a cylindrical surface portion, the inner partial spherical surfaces being connected to opposite sides of said cylindrical surface portion, said cylindrical surface portion has a sufficient length measured axially of a central portion of the cage to allow for relative movement of the inner member with respect to the cage thereby bringing a portion of the outer surface of the inner member into engagement with one of the partial spherical surfaces of the cage, to absorb an amount of movement of an engine produced during starting acceleration of the automobile.

29. A power transmission device for automobiles as set forth in claim 28, wherein the pocket clearance between the ball and the ball pocket of the cage of the slide type constant velocity universal joint is 5–50 $\mu$m, and the length of the cylindrical surface of the inner surface of the cage is 2–4 mm.

30. A power transmission device for automobiles as set forth in claim 29, wherein of the guide groove of the inner member of the slide type constant velocity universal joint, the portion extending from the center of curvature of the outer surface of the inner member to the end positioned at the innermost side of the cylindrical hole of the outer member is longer than the portion extending from the center of curvature of the outer surface of the inner member to the end positioned at the inlet side of the cylindrical hole of the outer member.

31. A power transmission device for automobiles as set forth in claim 28, wherein of the guide groove of the inner member of the slide type constant velocity universal joint, the portion extending from the center of curvature of the outer surface of the inner member to the end positioned at the innermost side of the cylindrical hole of the outer member is longer than the portion extending from the center of curvature of the outer surface of the inner member to the end positioned at the inlet side of the cylindrical hole of the outer member.

* * * * *